Aug. 22, 1933.   E. A. SMALL   1,923,461
WINDSHIELD HEATER
Filed Oct. 1, 1931   2 Sheets-Sheet 1
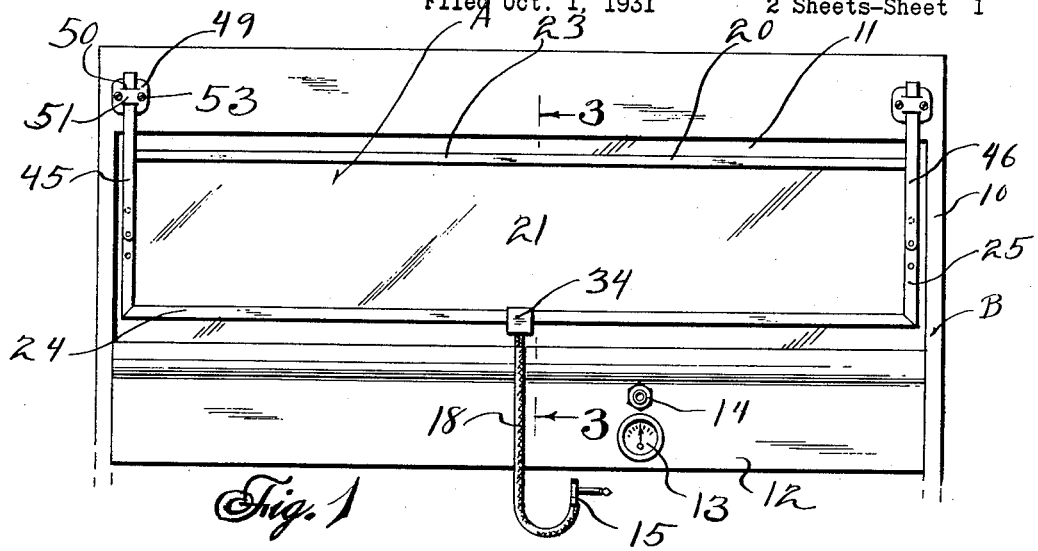
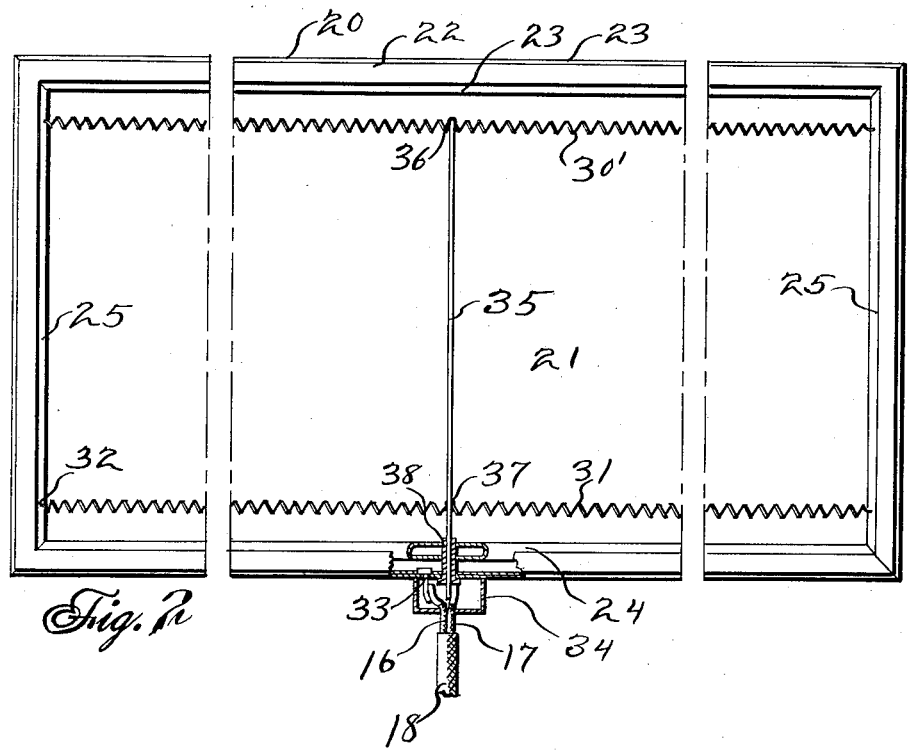
Inventor
E. A. Small
By
Attorneys Aug. 22, 1933.   E. A. SMALL   1,923,461
WINDSHIELD HEATER
Filed Oct. 1, 1931   2 Sheets-Sheet 2
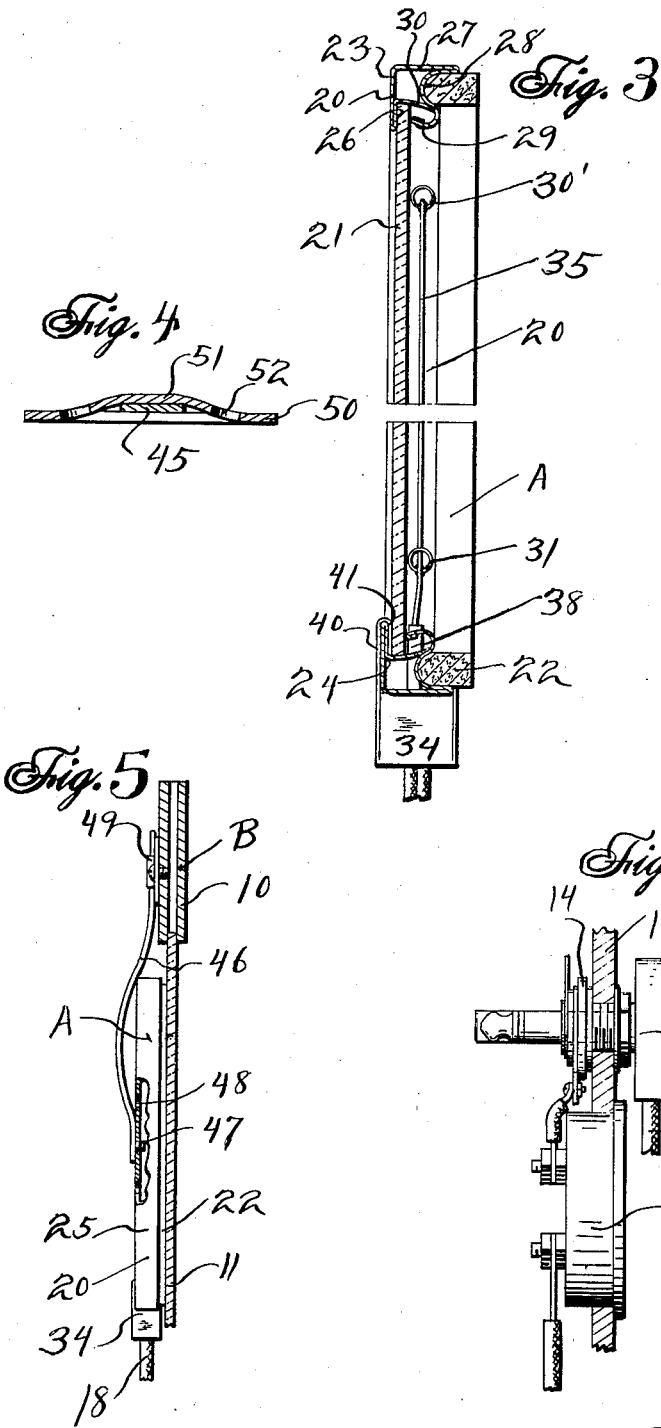

UNITED STATES PATENT OFFICE 1,923,461

WINDSHIELD HEATER

Edward A. Small, Franksville, Wis.

Application October 1, 1931. Serial No. 566,240

2 Claims. (Cl. 219—19)

This invention appertains to attachments for motor vehicles, and more particularly to a novel means for effectively preventing the collection of ice, frost and sleet, and the like, on a windshield of an automobile, so as to insure the proper vision of the driver of the automobile at all times, irrespective to weather conditions.

One of the primary objects of my invention is the provision of a novel heater for windshields, so constructed and designed as to permit the same to be readily connected with a conventional windshield of an automobile by the ordinary layman.

Another important object of my invention is the provision of an anti-frost attachment for the windshields of motor vehicles, embodying a frame supporting a pane of glass in spaced parallel relation to the windshield, with means carried by the frame for tightly engaging the windshield, so as to form a closed compartment in conjunction therewith, the frame also carrying an electrical resistance coil for heating the air within the closed chamber, and thereby warming the windshield, so as to prevent the collection of frost, ice and the like thereon.

A further salient object of my invention is the provision of novel means for arranging the heating coil within the compartment, whereby to insure the proper distribution of the current to the heating coil, so that the same will properly function to heat the surrounding air.

A further object of my invention is the provision of novel means for supporting the attachment on the windshield, whereby the attachment will not only be easy to place in position, but whereby the attachment will be normally urged at all times toward the windshield and in contact therewith.

A still further object of my invention is the provision of a novel anti-frost attachment for motor vehicles of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed and illustrated in the accompanying drawings, in which:

Figure 1 is a rear elevation of my improved windshield heater, showing the same attached to a conventional windshield of an automobile:

Figure 2 is a front elevation of the heater removed from the windshield, with parts thereof broken away and in section to illustrate structural details;

Figure 3 is a transverse section through the attachment taken on the line 3—3 of Figure 1, looking in the direction of the arrows;

Figure 4 is a detailed horizontal section taken on an enlarged scale illustrating a part of one of the supporting brackets for the windshield heater;

Figure 5 is an end elevation of my improved heater showing the same attached to a windshield, the windshield being shown in transverse section, parts of the heater being shown broken away and in section;

Figure 6 is an enlarged fragmentary transverse section through the instrument board of an automobile, illustrating the means employed for connecting the heater with the source of electrical energy of an automobile.

Referring to the drawings in detail, wherein similar reference characters designate corresponding parts throughout the several views, the letter "A" generally indicates my improved anti-frost attachment for an automobile "B".

The automobile "B" form no part of the present invention and only a fragment thereof has been shown to illustrate the use of my attachment therewith. As shown, the automobile "B" includes the windshield frame 10 supporting the windshield glass 11. As in the usual construction, the windshield glass 11 is arranged above the instrument board 12 of the automobile and the instrument board carries the ammeter 13.

In accordance with my invention, I connect with the instrument board 12, a jack or electric socket 14 and this jack or socket 14 is arranged adjacent to the ammeter 13 and is electrically connected with the ammeter 13 in a manner well known in the art. Detachably received within the jack or socket 14 is a plug 15 having electrically connected therewith, the feed wires 16 and 17. These wires 16 and 17 can be in the form of a cable or conduit 18.

My improved device "A" for heating the windshield for preventing the collection of frost and ice thereon, embodies an elongated rectangular metal frame 20 and this frame receives a pane of glass 21, which is adapted to be positioned in spaced parallel relation with the glass 11 of the windshield. The frame also supports on the inner face thereof at its margin, a felt or similar compressible strip 22 for contact with the windshield glass.

Particular attention is invited to Figure 3 of the drawings in which the specific construction of the frame 20 for supporting the glass 21 and the compressible strip 22 is shown. It will be noted that the frame includes upper and lower rails 23 and 24 respectively, and side connecting rails 25. Each of these rails is formed from a single sheet of metal, folded in such a manner as to provide a longitudinally extending seat 26 against which the glass 21 fits. The metal is then bent back upon itself and then at right angles as at 27, to provide an outer flange. The flange 27 is folded back upon itself and curved arcuately to provide a seat 28 for the compressible strip 22.

After the formation of the seat 28, the metal is bent in a reverse direction to provide a holding flange 29 for urging the glass pane 21 on its seat 26. The metal forming the seat can be bent inwardly as at 30 for engagement with the flange 29 to act as an additional support therefor.

From the above description, it can be seen that the metal forming each of the bars is so shaped as to not only provide means for supporting the glass pane, but also as means for supporting the compressible strip 22. The strip 22 is of such a size and thickness as to project beyond the inner face of the frame 20.

Referring to Figure 2, it will be noted that in order to heat the windshield, I provide upper and lower resistance coils 30 and 31, respectively. These coils are located adjacent to the upper and lower rails 23 and 24 of the frame and the opposite terminals of the resistance coils are anchored as at 32 to the side rails 25 and grounded therewith.

The conductor wire 16 leading from the plug 15 is grounded as at 33, with the frame 20 and it is to be noted that the cable or conduit 18 carrying the wires 16 and 17 lead to a receptacle 34 carried by the lower frame bar 24 at its transverse center. A conductor bus bar 35 extends transversely across the frame and is electrically connected as at 36 and 37, with the transverse centers of the resistance coils 30 and 31. The lower end of the bus bar 35 extends through a sleeve 38 formed of insulating material, carried by the lower frame bar 24.

The extreme lower end of the bus bar 25 extends into the receptacle 34 and has electrically connected therewith, the conductor wire 17.

The manner in which the wires 16 and 17 form electrical connection with the resistance wires 30 and 31 form an important part of my present invention, and it will be noted that the bus bar 35 connected with the coils 30 and 31 at a point intermediate their ends will effectively distribute the current thereto, so as to permit the proper heating of these coils.

The receptacle 34 is disposed under the lower frame bar 24, and the front wall of the receptacle is extended to provide an attaching plate 40. This plate 40 extends up the inner face of the frame bar 24 and is provided with a hook 41. This hook 41 engages over the seat 26 for the transparent pane 21. Obviously, the hook 41 is clamped between the seat 26 and the transparent pane, whereby to hold the receptacle in proper attached position.

As heretofore intimated, the frame 20 is placed in engagement with the inner face of the windshield and extends substantially entirely across the same, with the cushion strips 22 in engagement therewith. The windshield, the strips 22, the frame 20 and the glass 21 forms in conjunction with one another a substantially closed compartment and when the resistance coils 30 and 31 are connected with the source of electrical energy by means of the plug 15, the air in the closed compartment will be heated, which will maintain the windshield in a warm condition, so as to prevent the formation of ice and frost thereon.

I provide novel means for holding the attachment in intimate contact with the windshield glass, and this means comprises a pair of resilient arms 45 and 46. These arms 45 and 46 are in the nature of leaf springs, and the lower ends thereof carry pins 47 for selective engagement in any one of a plurality of openings 48 formed in the side bars 25 of the frame. Secured to the frame 10 of the windshield above the glass 11 are spaced metal brackets 49. These brackets 49 are in the nature of attaching plates and are provided with parallel slits 50, with the metal between the slits struck out to provide a loop 51. The upper ends of the resilient arms 45 and 46 are inserted through the slits 50 under the loop 51, as clearly shown in Figure 1 of the drawings. The attaching plates or brackets 49 are provided with openings 52 in the loop portion 51 thereof. Fastening elements 53 are inserted through the openings 52 into the frame of the windshield and act not only to secure the plates in position, but to bring the loops 51 into gripping contact with the upper ends of the resilient arms 45 and 46.

It is obvious that the attachment "A" can be raised or lowered on the windshield as may be desired by placing the pins 47 of the resilient arms in selected openings 48 formed in the windshield frame.

From the foregoing description, it can be seen that I have provided an exceptionally simple and durable means for bringing about the effective heating of the windshield in order to prevent the collection and adhering of ice and frost on the windshield.

Changes in details may be made without departing from the spirit or the scope of the appended claims; but what I claim as new is:

1. In a windshield heater, an open rectangular metal frame adapted to be placed vertically against a windshield, said frame including upper and lower spaced parallel bars and connecting end bars, each of said bars being formed from a single sheet of metal and including a vertically disposed seat, a transparent pane fitted against the seat, a vertically disposed flange extending outwardly from the seat, a laterally extending flange formed on the vertical flange, an inwardly curved seat formed on the lateral flange outwardly of the first mentioned seat, cushion strips received in the last mentioned seat, reversely curved resilient flanges formed on the last mentioned seat for engaging the transparent pane for holding the same against the first mentioned seat, said first mentioned seat being provided with a supporting flange engaging the last mentioned seat.

2. In an electrical heater for windshields of automobiles, an open rectangular frame adapted to be disposed vertically against a windshield, said frame including top and bottom metal rails and connecting side metal rails, all of the rails being provided with a vertically disposed seat, a transparent pane fitted against the seat, means holding the transparent pane against said seat, longitudinally extending heating coils carried by the frame, a receptacle disposed below the bottom rail and in engagement therewith, conductor wires extending into the receptacle, means grounding one of the conductor wires to the bottom rail, a bus bar connecting the resistance coils intermediate their ends together, a sleeve of insulation carried by the bottom rail extending into the receptacle receiving the lower end of the bus bar, the other of said conductor wires being electrically connected with the bus bar, an attaching plate carried by the upper edge of the receptacle and engaging the front face of the frame, and a hook formed on the plate clamped between the seat and the transparent panel.

EDWARD A. SMALL.